(12) United States Patent
Nakamura et al.

(10) Patent No.: US 11,814,304 B2
(45) Date of Patent: Nov. 14, 2023

(54) ULTRAVIOLET TREATMENT METHOD AND SYSTEM

(71) Applicant: PHOTOSCIENCE JAPAN CORPORATION, Tokyo (JP)

(72) Inventors: Tomoyoshi Nakamura, Hachioji (JP); Yuji Yamakoshi, Taito-ku (JP)

(73) Assignee: PHOTOSCIENCE JAPAN CORPORATION, Tokyo (JP)

( * ) Notice: Subject to any disclaimer, the term of this patent is extended or adjusted under 35 U.S.C. 154(b) by 113 days.

(21) Appl. No.: 16/676,543

(22) Filed: Nov. 7, 2019

(65) Prior Publication Data

US 2020/0165144 A1   May 28, 2020

(30) Foreign Application Priority Data

Nov. 28, 2018   (JP) ................................ 2018-222573

(51) Int. Cl.
  *C02F 1/32*   (2006.01)
  *C02F 1/42*   (2023.01)
  *C02F 101/30*  (2006.01)

(52) U.S. Cl.
  CPC ................ *C02F 1/32* (2013.01); *C02F 1/42* (2013.01); *C02F 2101/30* (2013.01);
  (Continued)

(58) Field of Classification Search
  CPC ..... C02F 1/32; C02F 1/34; C02F 1/72; B01D 32/34
  See application file for complete search history.

(56) References Cited

U.S. PATENT DOCUMENTS

| 10,040,700 | B2 | 8/2018 | Akiyama | |
| 2002/0033369 | A1* | 3/2002 | Bender | C02F 1/32 |
| | | | | 210/748.08 |

(Continued)

FOREIGN PATENT DOCUMENTS

| CA | 2824856 A1 | 7/2012 | |
| CN | 102159507 A * | 8/2011 | ............. B01J 35/08 |

(Continued)

OTHER PUBLICATIONS

JP-2008119658-A, May 2008; Yokoi, Ikunori: English translation (Year: 2008).*

(Continued)

*Primary Examiner* — Walter D. Griffin
*Assistant Examiner* — Cameron J Allen
(74) *Attorney, Agent, or Firm* — ROSSI, KIMMS & MCDOWELL LLP

(57) ABSTRACT

A process of dissolving into to-be-treated water a peroxodisulfate and metal ions other than ions of alkali metals is performed by pouring equipment. An ultraviolet irradiation apparatus performs a process of treating the to-be-treated water, having the peroxodisulfate and the metal ions other than ions of alkali metals dissolved therein, with ultraviolet rays. By performing UV treatment on the to-be-treated water having the peroxodisulfate and metal ions dissolved therein, the inventive method and system achieve improved TOC decomposing performance and thus can particularly decompose a urea component in an efficient manner. Further, the to-be-treated water may be treated with an ion-exchange resin at a subsequent stage in such a manner that organic acids contained in the to-be-treated water having been subjected to the UV treatment are adsorbed to the ion exchange-resin, with the advantageous result that the con- (Continued)

centration of TOC present in the to-be-treated water can be reduced.

11 Claims, 4 Drawing Sheets

(52) U.S. Cl.
CPC ...... *C02F 2201/32* (2013.01); *C02F 2303/04* (2013.01); *C02F 2305/023* (2013.01)

(56) References Cited

U.S. PATENT DOCUMENTS

| | | | |
|---|---|---|---|
| 2008/0119658 A1* | 5/2008 | Bressi et al. | A61B 27/02 |
| | | | 548/375.1 |
| 2008/0245738 A1* | 10/2008 | Coulter | C02F 1/008 |
| | | | 210/650 |
| 2011/0210072 A1 | 9/2011 | Kobayashi | |
| 2014/0346124 A1 | 11/2014 | Barbati et al. | |
| 2016/0221841 A1 | 8/2016 | Fukui | |

FOREIGN PATENT DOCUMENTS

| | | | | |
|---|---|---|---|---|
| CN | 103687819 A * | 3/2014 | | B01J 20/3204 |
| CN | 105217853 A | 1/2016 | | |
| JP | 2003190976 A * | 7/2003 | | |
| JP | 2003190976 A | 7/2003 | | |
| JP | 2008119658 A * | 5/2008 | | |
| JP | 2015093226 A | 5/2015 | | |
| JP | 2016196000 A | 11/2016 | | |
| TW | 200922884 A * | 6/2009 | | C02F 1/325 |
| WO | 2016143829 A1 | 9/2016 | | |

OTHER PUBLICATIONS

JP-2003190976-A, Jul. 2003, Bressi; Jerome C. trsndlstion (Year: 2003).*
English translation of TW-200922884-A; Ultraviolet Light Activated Oxidation Process For The Reduction Of Organic Carbon in Semiconductor Process Water; Jun. 2009, Carmignani Gary Michael (Year: 2009).*
Nishimura. "Treatment of Perfluoro Compounds (PFCs) by UV Physicochemical Process." Environmental & Sanitary Engineering Research. 2011. vol. 25,Third issue, pp. 70-73. Cited in Specification. English abstract provided.
Hori. "Persulfate-Induced Photochemical Decomposition of Perfluorooctanoic Acid (PFOA) and Its Related Chemicals in Water." Journal of Water and Waste. 2006. vol. 48, No. 12, pp. 1081-1087. Cited in Specification. English abstract provided.
Office Action issued in Japanese Appln. No. 2018-222573 dated Jul. 19, 2022. English translation provided.
Office Action issued in Chinese Appln. No. 201911181934.9 dated Sep. 20, 2022. English machine translation provided.
Office Action issued in Vietnamese Appln. No. 1-2019-06284 dated Oct. 28, 2022. English machine translation provided.
Office Action issued in Japanese Appln. No. 2018-222573 dated Dec. 27, 2022. English machine translation provided.

* cited by examiner

ABSORBANCE OF AQUEOUS SOLUTION OF POTASSIUM PERSULFATE OF 100 ppm (1-cm CELL)

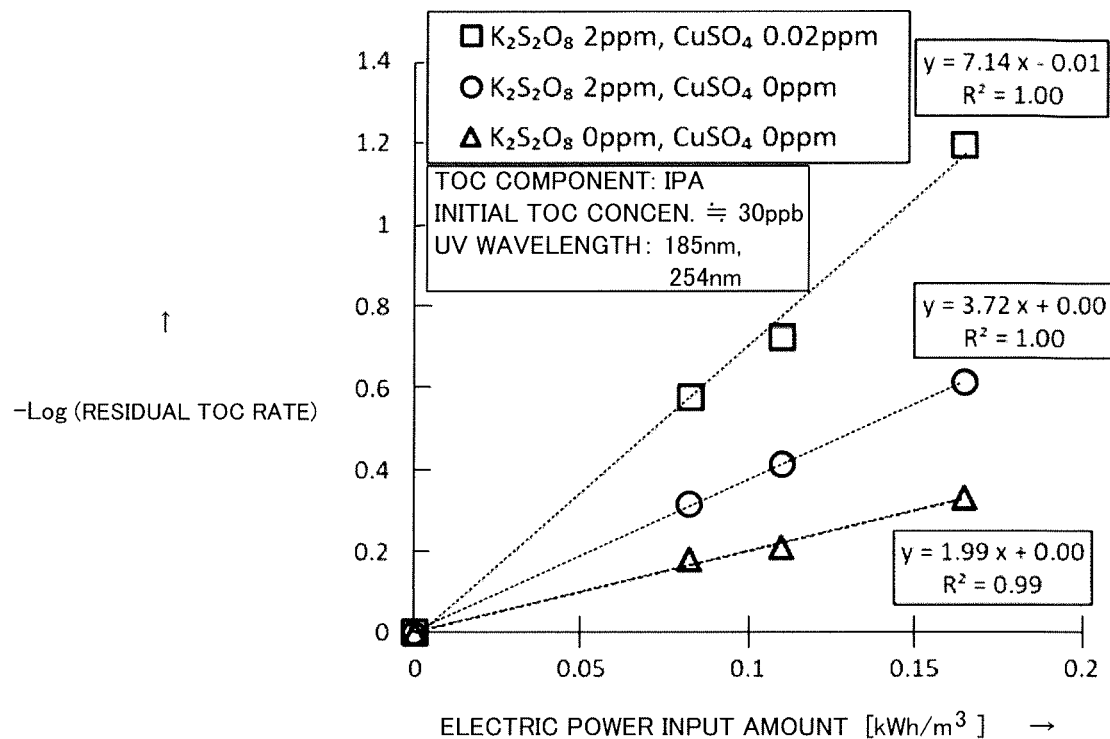
F I G. 7
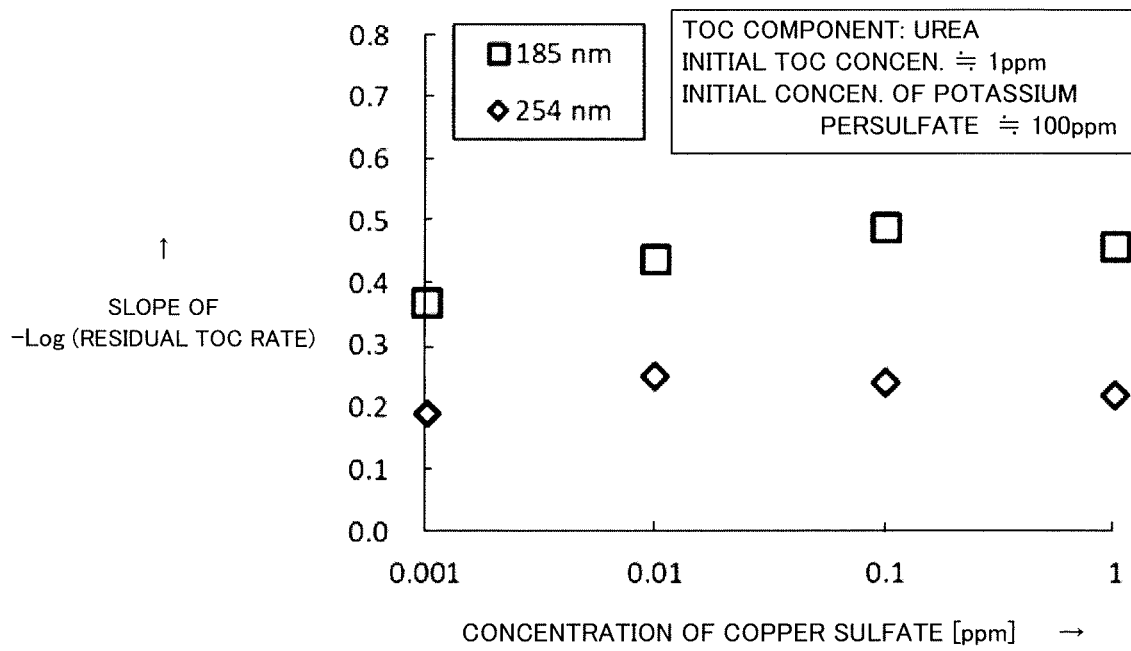
F I G. 8

ULTRAVIOLET TREATMENT METHOD AND SYSTEM

PRIORITY

This application is based on, and claims priority to, Japanese Patent Application No. 2018-222573 filed on 28 Nov. 2018. The disclosure of the priority application, in its entirety, including the drawings, claims, and the specification thereof, are incorporated herein by reference.

BACKGROUND

The present invention relates generally to an ultraviolet treatment method and system which treat a liquid by use of ultraviolet rays (UV rays) and which are suited particularly for ultrapure water manufacturing, and more particularly to decomposing organic matter dissolved in water to be treated.

In factories that manufacture semiconductors or FPDs (Flat Panel Displays), ultrapure water is used in product manufacturing steps. Water quality items of the ultrapure water include a viable bacteria count and a TOC (Total Organic Carbon) concentration. Ultraviolet ray (UV ray or UV) sterilization apparatus are used as one form of equipment for inactivating microorganisms, and UV oxidization apparatus are used as one form of equipment for reducing the TOC concentration. In these apparatus, one or more low-pressure mercury lamps for emitting ultraviolet rays of 254 nm and/or 185 nm (wavelength) light are accommodated in a cylindrical reaction vessel. Each of such low-pressure mercury lamps is inserted in a separate lamp protecting tube formed of quartz in such a manner that the lamp does not directly contact water to be treated (hereinafter referred to as "to-be-treated water" within the reaction vessel. The to-be-treated water is pressure-fed between the outside of the lamp protecting tube and the inside of the reaction vessel while being exposed to, or irradiated with, the ultraviolet rays emitted from each of the lamps. Microorganisms present in the to-be-treated water are inactivated by being exposed to, or irradiated with, the ultraviolet rays of 254 nm light. Such inactivation is commonly referred to also as sterilization. Further, OH radicals are produced from the to-be-treated water exposed to the ultraviolet rays of 185 nm light, and the thus-produced OH radicals function as an oxidizing agent to oxidatively decompose the TOC. At the same time, organic matter is decomposed directly by the 185 nm light and 254 nm light emitted from the low-pressure mercury lamp. Similar reactions can be caused to occur by use of a medium-pressure mercury lamp, a high-pressure mercury lamp, an excimer lamp, or the like other than the low-pressure mercury lamp, as long as the lamp used is a light source (ultraviolet ray lamp) that emits light of 300 nm wavelength or less. Quartz, sapphire, fluorine resin, or the like is used as a material of the lamp protecting tube. International Patent Application Publication WO 2016/143829 discloses an example of such a UV treatment apparatus.

Further, there have also been known a UV oxidation apparatus which performs UV irradiation of to-be-treated water with a hydrogen peroxide solution dissolved in the to-be-treated water as disclosed for example in Japanese Patent Application Laid-open Publication No. 2015-93226, and a UV oxidation apparatus which performs UV irradiation of to-be-treated water with a hypochlorite, ozone or the like dissolved in the to-be-treated water. Also known are UV oxidation apparatus which perform UV irradiation of to-be-treated water with a persulfate (namely, peroxodisulfate) dissolved in the to-be-treated water, as disclosed, for example, in Japanese Patent Application Lad-open Publication No. 2016-196000, in a non-patent literature "Treatment of perfluoro compounds (PFCs) by UV physicochemical process", Environmental & Sanitary Engineering Research, vol. 25, Third issue (2011), pp. 70-73, and in a non-patent literature "Persulfate-Induced Photochemical Decomposition of Perfluorooctanoic Acid (PFOA) and Its Related Chemicals in Water", Journal of Water and Waste, Vol. 48, No. 12 (2006), pp. 1081-1087. However, these conventionally known UV oxidation apparatus require a large amount of energy to decompose, for example, urea although they can decompose many types of organic matter, and thus, the conventionally known UV oxidation apparatus would require UV irradiating equipment of a large scale.

SUMMARY

In view of the foregoing prior art problems, it is one of the objects of the present invention to improve an organic matter decomposing efficiency without increasing the scale of UV irradiating equipment in a technique for decomposing organic matter, dissolved in to-be-treated water, by irradiating the to-be-treated water with ultraviolet rays (UV rays).

In order to accomplish the aforementioned and other objects, an inventive ultraviolet treatment method includes: dissolving into to-be-treated water a peroxodisulfate and metal ions other than ions of alkali metals; and treating the to-be-treated water, having the peroxodisulfate and the metal ions other than ions of alkali metals dissolved therein, with ultraviolet rays.

Further, an inventive ultraviolet treatment system includes: equipment that dissolves into to-be-treated water a peroxodisulfate and metal ions other than ions of alkali metals; and equipment that treats the to-be-treated water, having the peroxodisulfate and the metal ions other than ions of alkali metals dissolved therein, with ultraviolet rays.

Through an experiment conducted by an inventor of the present invention and others, it was confirmed that additionally dissolving metal ions other than ions of alkali metals into to-be-treated water having a peroxodisulfate (namely, persulfate) dissolved therein and then treating the resultant to-be-treated water with ultraviolet rays (namely, irradiating the to-be-treated water with UV rays) can decompose organic smatter present in the to-be-treated water with less energy as compared to a case where to-be-treated water having only a peroxodisulfate (namely, persulfate) dissolved therein is treated with ultraviolet rays. It was further confirmed that the present invention can particularly decompose urea present in the to-be-treated water in an efficient manner. Therefore, the present invention can improve an organic matter decomposing efficiency without increasing the scale of UV irradiating equipment.

The following will describe embodiments of the present invention, but it should be appreciated that the present invention is not limited to the described embodiments and various modifications of the invention are also possible without departing from the basic principles of the invention. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 7 is a graph illustrating results of Experimental Example 5; and

FIG. 8 is a graph illustrating results of an experiment in which the concentration of metal ions to be dissolved in to-be-treated water was varied within a range from 0.001 ppm to 1.0 ppm

DETAILED DESCRIPTION

Figure 1:
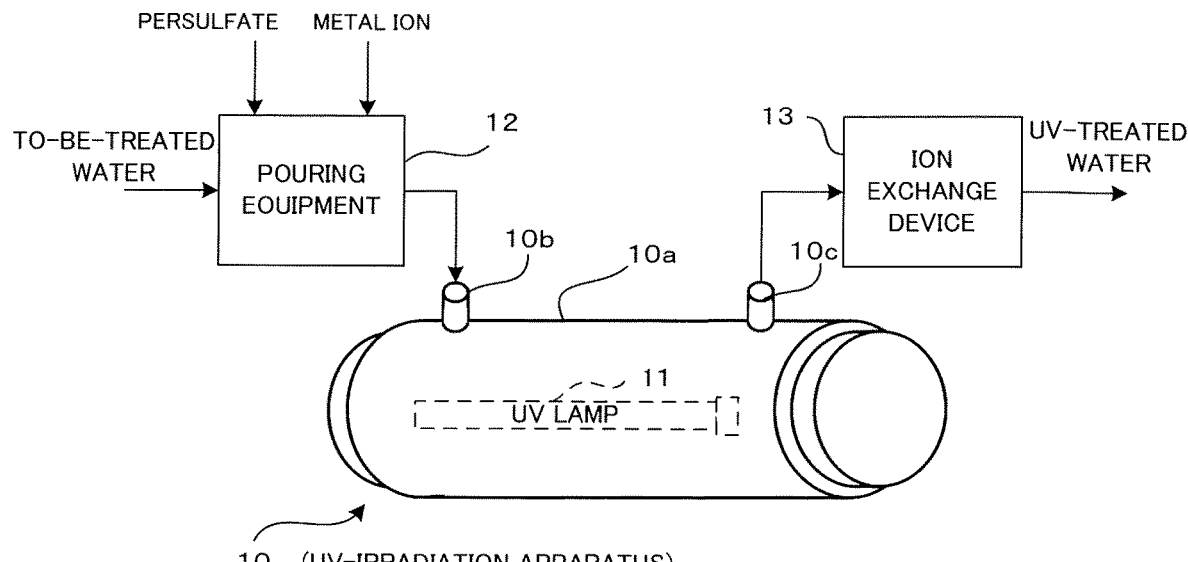
FIG. 1 is a block diagram schematically illustrating embodiments of an inventive ultraviolet ray treatment system and method.

FIG. 1 is a block diagram schematically illustrating embodiments of an inventive ultraviolet ray treatment system and method which are applied, for example, to an ultrapure water manufacturing system. An ultraviolet ray (UV ray) irradiation apparatus 10 provided in the ultraviolet ray treatment system is equipment for treating to-be-treated water with ultraviolet rays (UV rays), and the UV irradiation apparatus 10 includes a closed vessel 10a that has at least one UV lamp 11 accommodated therein as a UV light source. The UV irradiation apparatus 10 applies UV rays, emitted or radiated from the UV lamp 11, to to-be-treated water introduced into the closed vessel 10a through a supply port 10b and discharges through a discharge port 10c the water having been subjected to UV treatment (namely, UV-treated water). Pouring equipment 12 provided at a stage preceding the UV irradiation apparatus 10 is equipment for pouring a persulfate (namely, peroxodisulfate) and metal ions into the to-be-treated water to dissolve the poured persulfate (namely, peroxodisulfate) and metal ions into the to-be-treated water. As the persulfate (peroxodisulfate), a potassium persulfate ($K_2S_2O_8$), for example, may be dissolved into the to-be-treated water. Further, as the metal ions, metal ions other than ions of alkali metals may be dissolved into the to-be-treated water; for example, irons of at least one metal selected from among manganese, iron, copper, silver, gold, titanium, cerium, nickel, and ruthenium may be dissolved into the to-be-treated water.

Dissolving the metal ions other than ions of alkali metals into the to-be-treated water by the pouring equipment 12 may be executed by at least one of various approaches, such as pouring a solution containing the metal ions into the to-be-treated water, contacting a metal plate containing the metal ions with the to-be-treated water, and causing electrolytic decomposition of a metal plate containing the metal ions with the metal plate placed in contact with the to-be-treated water, or by any other appropriate approach than the aforementioned.

Specifically, the pouring equipment 12 may include a water tank for temporarily holding the to-be-treated water and may be constructed in such a manner as to pour the persulfate (peroxodisulfate) and metal ions into the water tank holding the to-be-treated water. Alternatively, the pouring equipment 12 may be composed of a pouring valve, a dissolving device, or the like provided in an intermediate portion of a pipe through which the to-be-treated water flows, or may be composed of a pouring adaptor (pouring valve, dissolving device, or the like) mounted to the supply port 10b of the vessel 10a of the UV irradiation apparatus 10. Note that the pouring equipment 12 does not have to be composed of only one equipment and may be composed of pouring equipment for dissolving the persulfate (peroxodisulfate) and pouring equipment for dissolving the metal ions; in the latter case, the two pouring equipment may be located in an appropriately-spaced-apart relation to each other. In short, it is only necessary that the pouring be performed as a step preceding the UV irradiation treatment.

The to-be-treated water having the persulfate (peroxodisulfate) and metal ions other than ions of alkali metals dissolved therein by the pouring equipment 12 is supplied into the vessel 10a via the supply port 10b of the UV irradiation apparatus 10 and exposed to UV rays radiated from the UV lamp 11 within the vessel 10a so that the to-be-treated water is subjected to the UV treatment. In this manner, TOC (Total Organic Carbon) contained in the to-be-treated water is oxidatively decomposed; particularly, oxidative decomposition of the TOC is promoted by the persulfate (peroxodisulfate) and metal ions other than ions of alkali metals dissolved in the to-be-treated water.

The to-be-treated water having been subjected to the UV treatment (namely, UV-treated water) and discharged via the discharge port 10c of the UV irradiation apparatus 10 is sent to an ion exchange device 13 at a subsequent stage, where the UV-treated water is treated with an ion-exchange resin. Organic acids contained in the water having been UV-treated through reaction in the UV irradiation apparatus 10 are adsorbed to the ion exchange-resin in such a manner that the TOC concentration of the UV-treated water can be reduced further. Note that the ion exchange device 13 is an optional device that may be provided or omitted as necessary.

Figure 2:
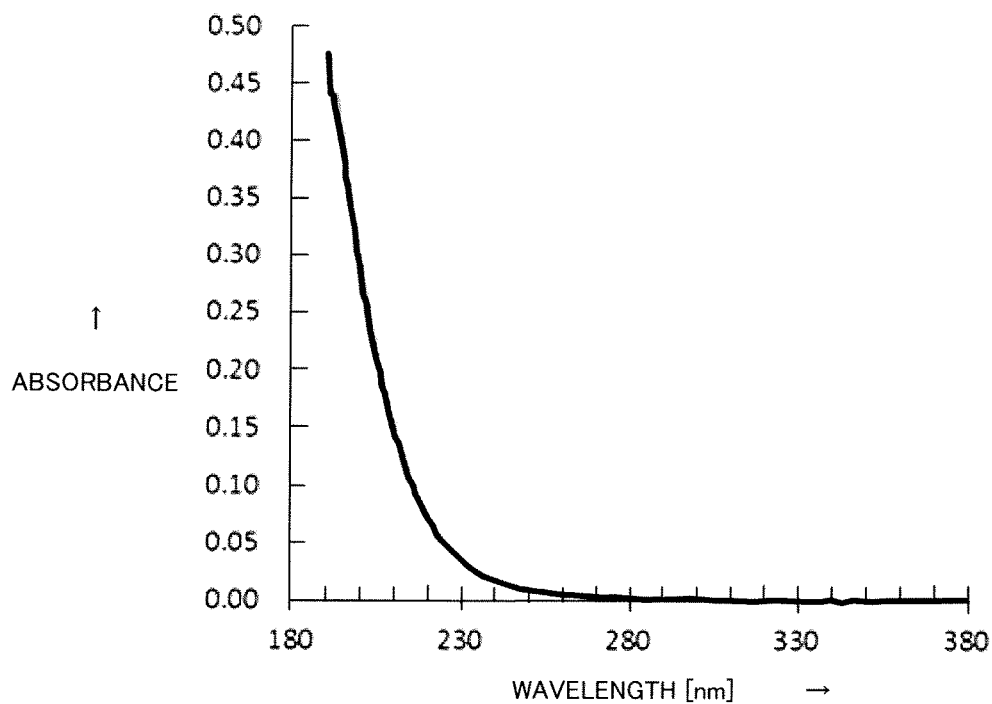
FIG. 2 is a graph illustrating an example of wavelength-vs.-absorbance characteristics of an aqueous solution of a potassium persulfate.

FIG. 2 is a graph illustrating an example of wavelength-vs.-absorbance characteristics of an aqueous solution of a potassium persulfate ($K_2S_2O_8$), which more particularly illustrates absorbance values, measured in a 1-cm cell, of the aqueous solution with the concentration of the potassium persulfate adjusted to 100 ppm. It can be seen from the graph of FIG. 2 that light absorption starts to be detected in the neighborhood of a 280 nm wavelength and the light absorbance increases as the wavelength decreases. In other words, it can be said that using a UV light source emitting light of wavelengths equal to and shorter than 280 nm is efficient. Examples of light sources that are industrially suited to satisfy such conditions include a low-pressure mercury lamp emitting light of 185 nm wavelength, a low-pressure mercury lamp emitting light of 254 nm wavelength, a mercury lamp of another type than such low-pressure mercury lamps, an excimer lamp, an LED (light emitting diode), a laser, and the like; however, any other suitable light source than the aforementioned light sources may be used. Note that examples of the aforementioned "mercury lamp of another type than such low-pressure mercury lamps" include, among others, a medium-pressure mercury lamp, a high-pressure mercury lamp, and an ultra-high-pressure mercury lamp, and the like that differ from one another in terms of a mercury vapor pressure at the time of lighting up. Therefore, any one of a low-pressure mercury lamp, another type of mercury lamp, an excimer lamp, an LED, a laser, and the like may be selected as the UV lamp 11 (UV light source) to be used in the UV irradiation apparatus 10.

The following paragraphs set forth results of several experiments in order to demonstrate an advantageous TOC decomposing effect achieved by the inventive method and/or system in comparison with a TOC decomposing effect achieved by a conventionally known technique.

FIGS. 3 to 7 are graphs illustrating results of Experimental Example 1 to Experimental Example 5. More specifically, each of the graphs of FIGS. 3 to 7 illustrates relationship between an electric power input amount to the UV light source represented on the horizontal axis of the graph and a residual TOC rate after the UV treatment (more specifically, −Log (residual TOC rate), namely, a minus logarithmic value of the residual TOC rate) represented on the vertical axis of the graph. Here, the residual TOC rate is a value based on a ratio (a/b) of the TOC concentration of the to-be-treated water passed through the ion-exchange resin after having been subjected to the UV irradiation (a) to the TOC concentration of the to-be-treated water passed through the ion-exchange resin without being subjected to the UV irradiation (b). The TOC concentration in the to-be-treated water was adjusted to about 1 ppm in Experimental Examples 1 to 4 illustrated in FIGS. 3 to 6, and the TOC concentration in the to-be-treated water was adjusted to about 30 ppb in Experimental Example 5 illustrated in FIG. 7. In each of the illustrated examples of FIGS. 3 to 7, results of the experiment in which the to-be-treated water having both of a persulfate (peroxodisulfate) and metal ions dissolved therein was subjected to UV treatment in accordance with the inventive method are plotted in rectangular marks, and results of the experiment in which the to-be-treated water having only a persulfate (peroxodisulfate) dissolved therein was subjected to UV treatment in accordance with the conventionally known technique are plotted in circular marks. Further, results of the experiment in which the to-be-treated water having neither a persulfate (peroxodisulfate) nor metal ions dissolved therein was subjected to UV treatment are plotted in triangular marks. Furthermore, for each of the experiments, a slope of a line connecting the plotted results is briefly indicated in a linear function (horizontal axis x and vertical axis y), and a value of a determination coefficient $R^2$ calculated from the linear function is indicated together with the above-mentioned slope. Note that in each of the experimental examples, a potassium persulfate ($K_2S_2O_8$) was used as the persulfate (peroxodisulfate) to be dissolved in the to-be-treated water and a copper sulfate ($CuSO_4$) was used as the metal ions to be dissolved in the to-be-treated water.

Figure 3:
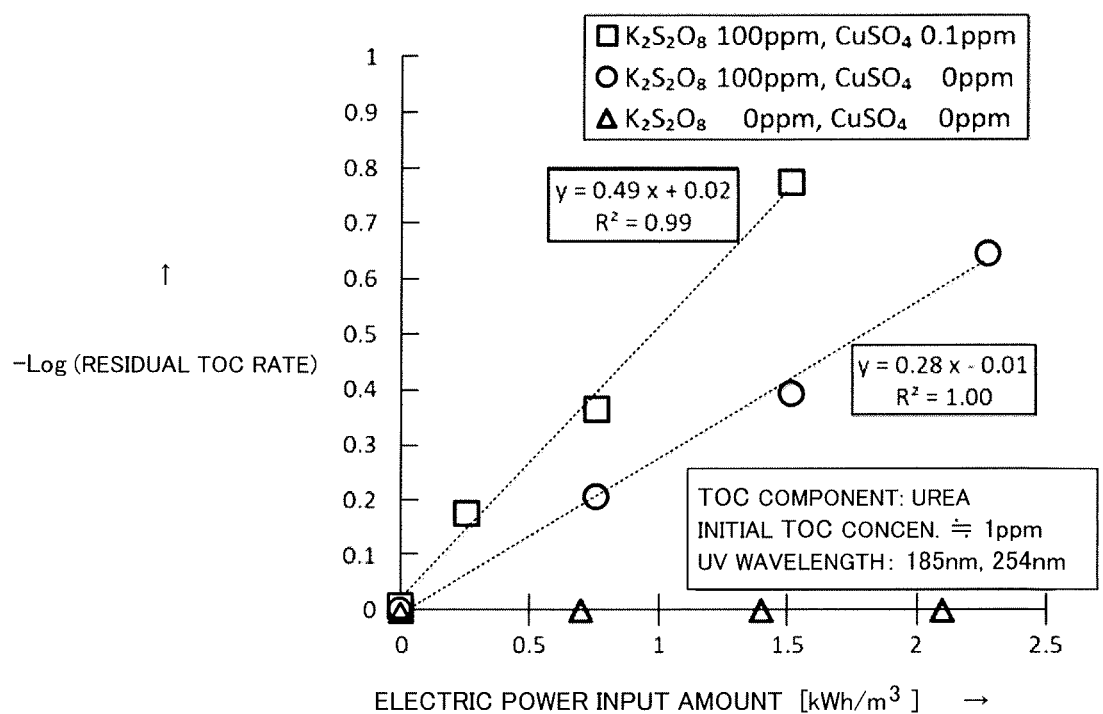
FIG. 3 is a graph illustrating results of Experimental Example 1.

In Experimental Example 1 illustrated in FIG. 3, urea with an initial concentration of 1 ppm was contained as a TOC component in the to-be-treated water, and a low-pressure mercury lamp emitting UV light of 185 nm wavelength was used as the UV light source. Because this low-pressure mercury lamp also emits UV light of 254 nm wavelength simultaneously with the UV light of 185 nm wavelength, the wavelength of the low-pressure mercury lamp is indicated as "wavelengths 185 nm and 254 nm" in the figure. In this Experimental Example 1, a potassium persulfate ($K_2S_2O_8$) of 100 ppm and a copper sulfate ($CuSO_4$) of 0.1 ppm were dissolved in the to-be-treated water, in order to obtain the experimental results according to the inventive method (namely, the results of the experiment conducted in accordance with the inventive method) plotted in the rectangular marks in the figure. Further, only a potassium persulfate ($K_2S_2O_8$) of 100 ppm was dissolved in the to-be-treated water, in order to obtain the experimental results according to the conventionally known technique (namely, the results of the experiment conducted in accordance with the conventionally known technique) plotted in the circular marks in the figure. Further, in the illustrated example of FIG. 3, the electric power input amount was in a range of 0 to 2.5 kWh/m³. With this electric power input amount range, no TOC component reducing effect is achieved in the case where neither the potassium persulfate nor the copper sulfate is dissolved in the to-be-treated water, as seen in the experimental results plotted in the triangular marks. However, some TOC component reducing effect is achieved in the case where only the potassium persulfate is dissolved in the to-be-treated water, as seen in the experimental results plotted in the circular marks; however, in this case, the slope of the "−Log (residual TOC rate)", namely, "minus logarithmic value of the residual TOC rate" is about 0.28, from which it can be seen that a more electric power input amount is necessary to achieve a desired TOC reducing effect. For example, with an electric power input amount of 0.6 kWh/m³, about 70% of the TOC remains as a residue. By contrast, in the experimental results according to the inventive method plotted in the rectangular marks in FIG. 3, the slope of the "−Log (residual TOC rate)" is about 0.49, from which it can be seen that a less electric power input is necessary to achieve a desired TOC reducing effect. For example, with an electric power input amount of 0.6 kWh/m³, only about 50% of the TOC remains as a residue. By comparing the slopes of the "−Log (residual TOC rates)", it can be seen that the experimental results (presenting the slope of about 0.49) according to the inventive method plotted in the rectangular marks achieves TOC decomposing performance about 1.75 times higher than that achieved by the experimental results (presenting the slope of about 0.28) according to the conventionally known technique plotted in the circular marks.

Thus, it can be understood that in the case where the UV light source of 185 nm wavelength is used, dissolving not only the persulfate (peroxodisulfate) but also the metal ions into the to-be-treated water can greatly contribute to improvement of the TOC decomposing performance. Particularly, it is generally required to ensure that the TOC concentration of ultrapure water to be used in semiconductor factories is in the range of 0.5 to 1.0 ppb. However, with a conventionally known ultrapure water manufacturing technique, the residual TOC rate in the UV-treated water may sometimes slightly exceed 1.0 ppb if the raw water to be treated contains urea, and thus, it has been a big challenge to efficiently decompose urea-containing TOC in particular. However, because the urea decomposing performance achieved by the inventive method is about 1.75 times higher than that achieved by the conventionally known technique as noted above, the inventive method can ensure, with no inconvenience, the required residual TOC concentration that was difficult for the conventionally known technique to ensure. Namely, the inventive method can improve the performance for decomposition of urea-containing TOC in particular without increasing the electric power input amount, and thus, the inventive method can improve an organic matter decomposing efficiency without increasing the scale of the UV irradiating equipment.

Figure 4:
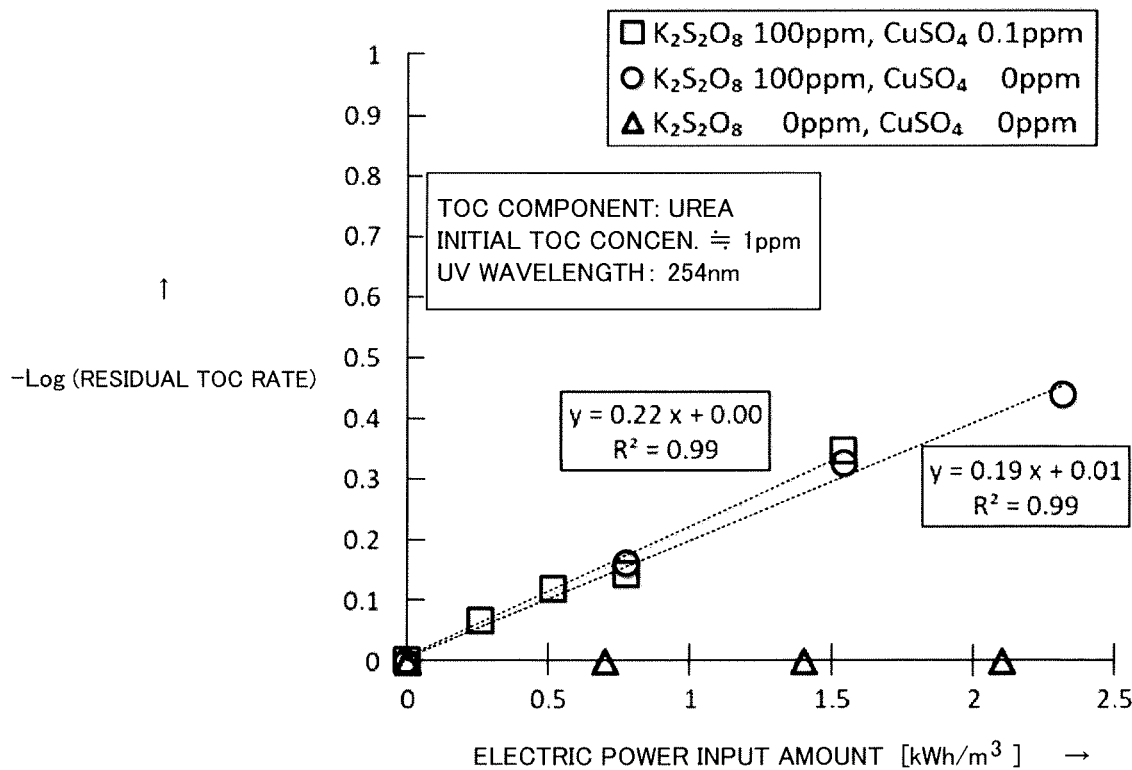
FIG. 4 is a graph illustrating results of Experimental Example 2.

In Experimental Example 2 illustrated in FIG. 4, urea with an initial concentration of 1 ppm was contained as a TOC component in the to-be-treated water as in Experimental Example 1 above. However, this Experimental Example 2 used, as the UV light source, a low-pressure mercury lamp that emits UV light of 254 nm wavelength. Further, in this Experimental Example 2, as in Experimental Example 1, a potassium persulfate ($K_2S_2O_8$) of 100 ppm and a copper sulfate ($CuSO_4$) of 0.1 ppm were dissolved in the to-be-treated water, in order to obtain the experimental results according to the inventive method plotted in the rectangular marks in the figure. Further, only a potassium persulfate ($K_2S_2O_8$) of 100 ppm was dissolved in the to-be-treated water, in order to obtain the experimental results according to the conventionally known technique plotted in the circular marks in the figure. Furthermore, in the illustrated example of FIG. 4, as in the aforementioned example, the electric power input amount was in the range of 0 to 2.5 kWh/m$^3$. With such an electric power input amount range, in the case where the UV light of 254 nm wavelength is used too, no TOC component reducing effect is achieved because neither the potassium persulfate nor the copper sulfate is dissolved in the to-be-treated water, as seen in the experimental results plotted in the triangular marks. However, some TOC component reducing effect is achieved in the case where only the potassium persulfate is dissolved in the to-be-treated water, as seen in the experimental results plotted in the circular marks; however, in this case, the slope of the "−Log (residual TOC rate)" is about 0.19. By contrast, in the experimental results according to the inventive method plotted in the rectangular marks in FIG. 4, the slope of the "−Log (residual TOC rate)" is about 0.22, from which it can be seen that the inventive method has improved the TOC decomposing performance as compared to the conventionally known technique. However, it can also be seen that the UV light source of 185 nm wavelength used in aforementioned Experimental Example 1 has a higher performance for decomposition of urea-containing TOC.

Figure 5:
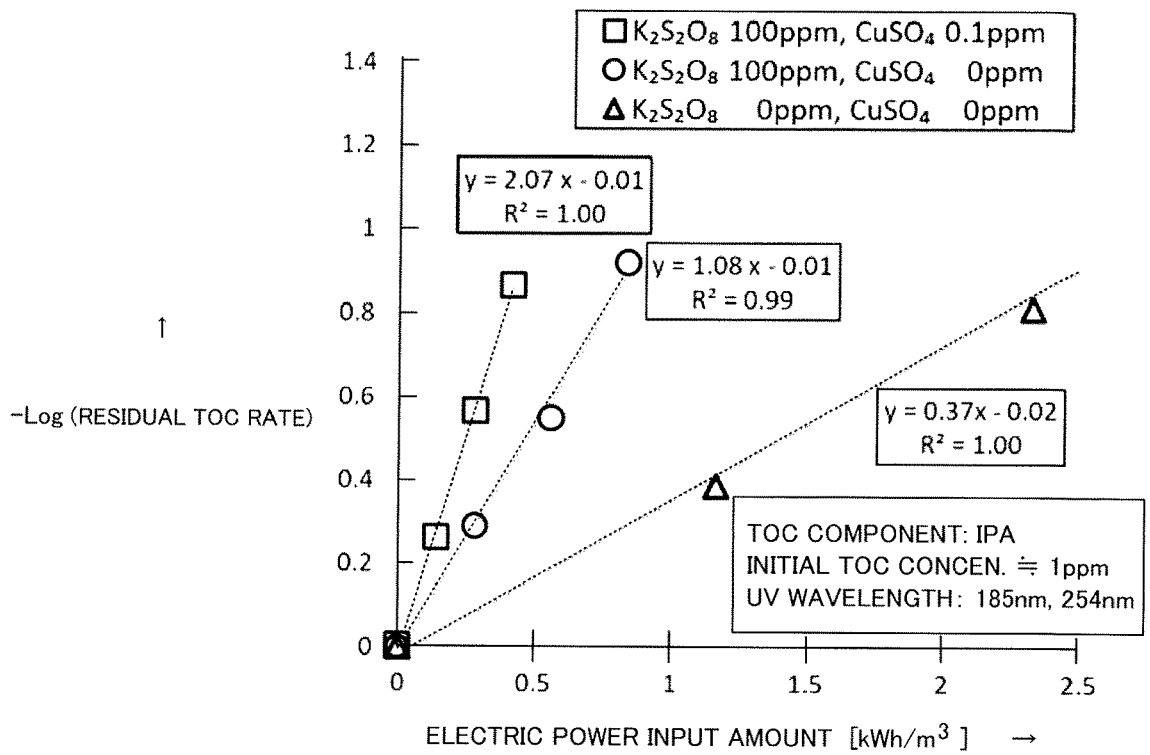
FIG. 5 is a graph illustrating results of Experimental Example 3.

In Experimental Example 3 illustrated in FIG. 5, an IPA (isopropyl alcohol) with an initial concentration of 1 ppm was contained as a TOC component in the to-be-treated water, and a low-pressure mercury lamp emitting UV light of 185 nm wavelength was used as the UV light source. In this Experimental Example 3, as in aforementioned Experimental Example 1 and Experimental Example 2, a potassium persulfate ($K_2S_2O_8$) of 100 ppm and a copper sulfate ($CuSO_4$) of 0.1 ppm were dissolved in the to-be-treated water, in order to obtain the experimental results according to the inventive method plotted in the rectangular marks in the figure. Further, only a potassium persulfate ($K_2S_2O_8$) of 100 ppm was dissolved in the to-be-treated water, in order to obtain the experimental results according to the conventionally known technique plotted in the circular marks in the figure. In this example, the electric power input amount was in the range of 0 to 2.5 kWh/m$^3$, as in aforementioned Experimental Example 1 and Experimental Example 2. Further, according to this Experimental Example 3, even in the case where neither the potassium persulfate nor the copper sulfate is dissolved in the to-be-treated water, some advantageous effect of reducing the IPA as a TOC component is achieved (the slope of the residual TOC rate is about 0.37), as seen in the experimental results plotted in the triangular marks in the figure. Further, in the case where only the potassium persulfate is dissolved in the to-be-treated water, a further TOC component reducing effect is achieved, as seen in the experimental results plotted in the circular marks; in this case, the slope of the "−Log (residual TOC rate)" is about 1.08. By contrast, in the experimental results according to the inventive method plotted in the rectangular marks in FIG. 5, the slope of the "−Log (residual TOC rate)" is about 2.07, from which it can be seen that the TOC decomposing performance has been improved as compared to the conventionally known technique.

Figure 6:
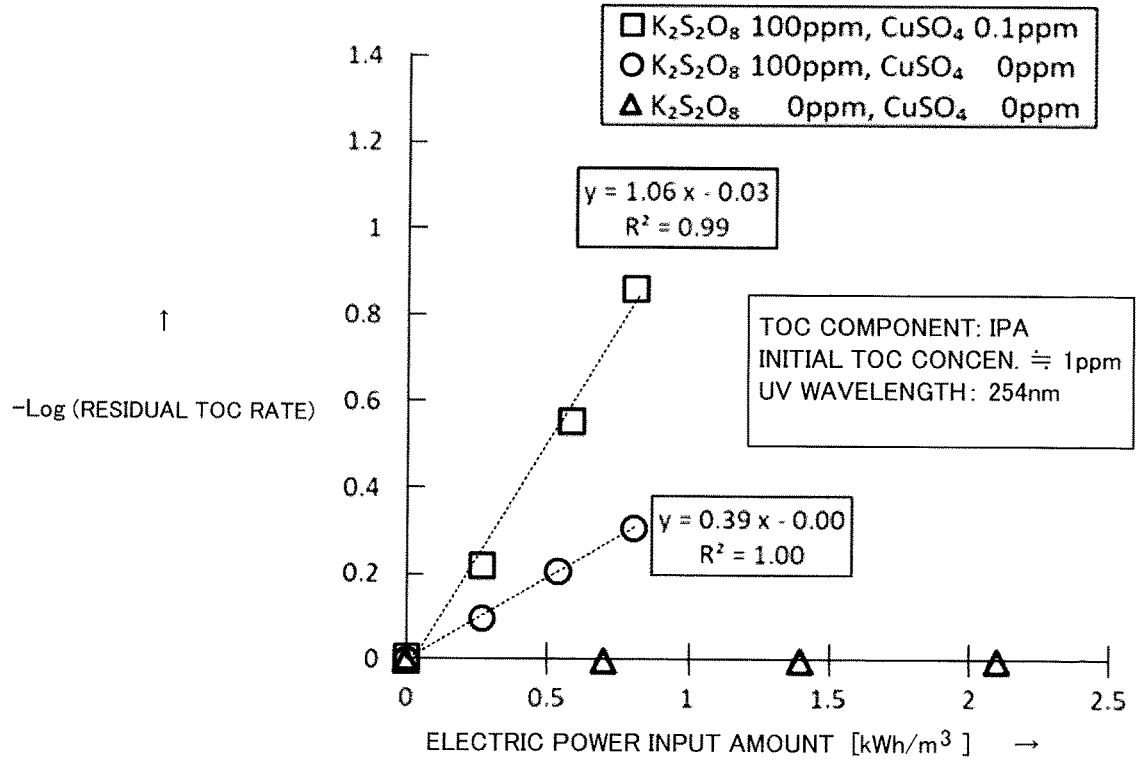
FIG. 6 is a graph illustrating results of Experimental Example 4.

In Experimental Example 4 illustrated in FIG. 6, an IPA (isopropyl alcohol) with an initial concentration of 1 ppm was contained as a TOC component in the to-be-treated water, and a low-pressure mercury lamp emitting UV light of 254 nm wavelength was used as the UV light source. In this Experimental Example 4, as in aforementioned Experimental Example 1 to Experimental Example 3, a potassium persulfate ($K_2S_2O_8$) of 100 ppm and a copper sulfate ($CuSO_4$) of 0.1 ppm were dissolved in the to-be-treated water in order to obtain the experimental results according to the inventive method plotted in the rectangular marks in the figure, and also only a potassium persulfate ($K_2S_2O_8$) of 100 ppm was dissolved in the to-be-treated water in order to obtain the experimental results according to the conventionally known technique plotted in the circular marks in the figure. Further, in the illustrated example of FIG. 6, as in the aforementioned examples, the electric power input amount was in the range of 0 to 2.5 kWh/m$^3$. With the UV light source of 254 nm wavelength, no TOC component reducing effect is achieved in the case where neither the potassium persulfate nor the copper sulfate is dissolved in the to-be-treated water, as seen in the experimental results plotted in the triangular marks in the figure. However, in the case where only the potassium persulfate is dissolved in the to-be-treated water, some effect of reducing the IPA as a TOC component is achieved; in this case, the slope of the "−Log (residual TOC rate)" is about 0.39. By contrast, in the experimental results according to the inventive method plotted in the rectangular marks in FIG. 6, the slope of the "−Log (residual TOC rate)" is about 1.06, from which it can be seen that the inventive method has improved the TOC decomposing performance as compared to the conventionally known technique.

Further, in Experimental Example 5 illustrated in FIG. 7, an IPA (isopropyl alcohol) with an initial concentration of 30 ppb was contained as a TOC component in the to-be-treated water, and a low-pressure mercury lamp emitting UV light of 185 nm wavelength was used as the UV light source. In this Experimental Example 5, a potassium persulfate ($K_2S_2O_8$) of 2 ppm and a copper sulfate ($CuSO_4$) of 0.02 ppm were dissolved in the to-be-treated water in order to obtain the experimental results according to the inventive method plotted in the rectangular marks in the figure, and also only a potassium persulfate ($K_2S_2O_8$) of 2 ppm was dissolved in the to-be-treated water in order to obtain the experimental results according to the conventionally known technique plotted in the circular marks in the figure. Further, in the illustrated example of FIG. 7, the electric power input amount was in a range of 0 to 0.2 kWh/m$^3$. Even in the case where neither the potassium persulfate nor the copper sulfate is dissolved in the to-be-treated water, some advantageous effect of reducing the IPA as a TOC component is achieved (the slope of the residual TOC rate is about 1.99), as seen in the experimental results plotted in the triangular marks in the figure. In the case where only the potassium persulfate is dissolved in the to-be-treated water, a further TOC component reducing effect is achieved (the slope of the "−Log (residual TOC rate)" is about 3.72), as seen in the experimental results plotted in the circular marks in FIG. 7. By contrast, in the experimental results according to the inventive method plotted in the rectangular marks in FIG. 7, the slope of the "−Log (residual TOC rate)" is about 7.14, from which it can be seen that the inventive method has even further improved the TOC decomposing performance as compared to the conventionally known technique.

By Experimental Examples 3 to 5 set forth above, it can be seen that the inventive method can also improve the performance for decomposition of TOC components other than urea as compared to the conventionally known technique.

It should be noted that the persulfate (peroxodisulfate) to be dissolved in the to-be-treated water in the present invention is not limited to the potassium persulfate ($K_2S_2O_8$) and may be another type of peroxodisulfate. Further, the concentration of the persulfate (peroxodisulfate) to be dissolved in the to-be-treated water in the present invention is not limited to 100 ppm or 2 ppm indicated in relation to the aforementioned experimental examples, and any other suitable concentration of the persulfate (peroxodisulfate) may be chosen as appropriate. Note that instead of pouring crystals of the persulfate (peroxodisulfate) directly into the to-be-treated water to dissolve the persulfate (peroxodisulfate) crystals into the to-be-treated water or pouring a solution of the persulfate (peroxodisulfate) directly into the to-be-treated water to dissolve the solution into the to-be-treated water as noted above, the pouring equipment 12 may produce the persulfate by electrolytically decomposing a sulfuric acid solution and dissolve the thus-produced persulfate into the to-be-treated water. Furthermore, the metal ions other than ions of alkali metals to be to be dissolved in the to-be-treated water in the present invention are not limited to ions of the copper sulfate ($CuSO^4$) and may be ions of any other suitable type of metal. Furthermore, the concentration of the metal ions to be dissolved in the to-be-treated water is not limited to 0.1 ppm or 0.02 ppm indicated in relation to the aforementioned experimental examples, and any other suitable concentration of the metal ions may be chosen as appropriate.

FIG. 8 is a graph illustrating results of an experiment in which the concentration of the metal ions to be dissolved in the to-be-treated water in the present invention was varied within a range from 0.001 ppm to 1.0 ppm. In the illustrated example of FIG. 8, the metal ions dissolved in the to-be-treated water was a copper sulfate ($CuSO_4$) as in the aforementioned experimental examples, and the persulfate (peroxodisulfate) dissolved in the to-be-treated water together with the metal ions was a potassium persulfate ($K_2S_2O_8$) as in aforementioned Experimental Examples 1 to 4. Further, the TOC component contained in the to-be-treated water was urea with an initial concentration of 1 ppm as in aforementioned Experimental Examples 1 and 2. Furthermore, the UV light source used for the UV treatment was composed of a low-pressure mercury lamp emitting UV light of 185 nm wavelength and a low-pressure mercury lamp emitting UV light of 254 nm wavelength. The horizontal axis in FIG. 8 represents the concentration of the copper sulfate ($CuSO_4$) dissolved in the to-be-treated water, while the vertical axis in FIG. 8 represents the slope of the "–Log (residual TOC rate)" relative to the electric power input amount. The experimental results obtained when the to-be-treated water was treated with the UV light of 185 nm wavelength are plotted in rectangular marks in the figure, and the experimental results obtained when the to-be-treated water was treated with the UV light of 254 nm wavelength are plotted in rhombic marks in the figure. For example, in the case where the concentration of the copper sulfate ($CuSO_4$) was 0.1 ppm, the experimental results illustrated in FIG. 8 are similar to those obtained in Experimental Examples 1 and 2 illustrated in FIGS. 3 and 4, and the slope of the "–Log (residual TOC rate)" relative to the electric power input amount in the case where the to-be-treated water was treated with the UV light of 185 nm wavelength is about 0.49 while the slope of the "–Log (residual TOC rate)" relative to the electric power input amount in the case where the to-be-treated water was treated with the UV light of 254 nm wavelength is about 0.22. Similarly to the above, the slopes of the "–Log (residual TOC rate)" corresponding to the individual wavelengths in the cases where the concentration of the copper sulfate ($CuSO_4$) was 0.001 ppm, 0.01 ppm, and 1.0 ppm are plotted in rectangular marks and rhombic marks, respectively. In view of the data that the slope of the "–Log (residual TOC rate)" relative to the electric power input amount in the experimental results plotted in the circular marks in FIGS. 3 and 4 to describe the conventionally known technique (where metal ions were not dissolved in the to-be-treated water) is about 0.28 for the UV light of 185 nm wavelength and about 0.19 for the UV light of 254 nm wavelength, it can been seen that the slope of the "–Log (residual TOC rate)" relative to the electric power input amount for the lowest copper sulfate concentration of 0.001 ppm in FIG. 8 is greater than the aforementioned slopes of the "–Log (residual TOC rate)" of the conventionally known technique. Therefore, the present invention can improve the TOC decomposing performance as long as the concentration of the metal ions (such as copper sulfate ions) is at least 0.001 ppm or more. Further, it is preferable that the concentration of the metal ions (such as copper sulfate ions) be selected from the range of 0.001 ppm to 1.0 ppm.

What is claimed is:

1. An ultraviolet treatment method comprising:
    holding, by a first vessel, to-be-treated water;
    introducing a peroxodisulfate and copper ions into the first vessel;
    dissolving the peroxodisulfate and the copper ions into to-be-treated water held by the first vessel, wherein resultant to-be-treated water held by the first vessel contains the peroxodisulfate and the copper ions dissolved therein;
    receiving, by a second vessel and from the first vessel, the resultant to-be-treated water containing the peroxodisulfate and the copper ions dissolved therein, wherein the second vessel includes (i) a supply port arranged downstream of the first vessel to receive the resultant to-be-treated water and (ii) a light source arranged inside the second vessel; and
    treating the resultant to-be-treated water, having the peroxodisulfate and the copper ions dissolved therein, received by the second vessel via the supply port with ultraviolet rays radiated by the light source.

2. The ultraviolet treatment method as claimed in claim 1, wherein the copper ions are dissolved into the to-be-treated water by dissolving a copper sulfate into the to-be-treated water held by the first vessel.

3. The ultraviolet treatment method as claimed in claim 1, wherein the light source is any one of a low-pressure mercury lamp, another type of mercury lamp, an excimer lamp, an LED, and a laser.

4. The ultraviolet treatment method as claimed in claim 3, wherein the light source is the low-pressure mercury lamp, and the low-pressure mercury lamp radiates at least ultraviolet rays of 185 nm wavelength.

5. The ultraviolet treatment method as claimed in claim 1, further comprising:
    treating with an ion-exchange resin the resultant to-be-treated water having been treated with the ultraviolet rays.

6. The ultraviolet treatment method as claimed in claim 1, wherein the dissolving the peroxodisulfate and the copper ions into the to-be-treated water includes:
    (i) pouring a solution containing the copper ions into the to-be-treated water, (ii) contacting a metal plate containing the copper ions with the to-be-treated water, (iii) causing electrolytic decomposition of a first metal plate containing the copper ions with a second metal plate containing the copper ions placed in contact with the to-be-treated water, (i) and (ii), (i) and (iii), (ii) and (iii), or (i), (ii), and (iii).

7. The ultraviolet treatment method as claimed in claim 1, wherein a concentration of the copper ions is selected from a range of 0.001 ppm to 1.0 ppm.

8. The ultraviolet treatment method as claimed in claim 1, wherein the treating the resultant to-be-treated water comprises:
 radiating, by the light source, the ultraviolet rays to the resultant to-be-treated water to decompose organic matter dissolved in the resultant to-be-treated water.

9. An ultraviolet treatment system comprising:
 to-be-treated water, a peroxodisulfate, and copper ions;
 a first vessel holding the to-be-treated water and configured to dissolve the peroxodisulfate and the copper ions into the to-be-treated water, wherein resultant to-be-treated water held by the first vessel contains the peroxodisulfate and the copper ions dissolved therein; and
 a second vessel including (i) a supply port arranged downstream of the first vessel and (ii) a light source arranged inside the second vessel, the supply port being configured to receive, from the first vessel, the resultant to-be-treated water, having the peroxodisulfate and the copper ions dissolved therein, and the light source being configured to treat the resultant to-be-treated water, having the peroxodisulfate and the copper ions dissolved therein, received via the supply port and held in the second vessel with ultraviolet rays.

10. The ultraviolet treatment system as claimed in claim 9, wherein the light source includes a low-pressure mercury lamp configured to radiate at least ultraviolet rays of 185 nm wavelength.

11. The ultraviolet treatment system as claimed in claim 9, further comprising:
 an ion exchange device,
 wherein the second vessel further comprises a discharge port, and the ion exchange device is configured (i) to receive, via the discharge port, the resultant to-be-treated water having been treated with the ultraviolet rays and (ii) to treat, with an ion-exchange resin, the resultant to-be-treated water having been treated with the ultraviolet rays.

* * * * *